United States Patent [19]
Ehrhart et al.

[11] Patent Number: 5,891,582
[45] Date of Patent: *Apr. 6, 1999

[54] (METH)ACRYLATED, HIGHLY ETHOXYLATED, AROMATIC POLYESTERS

[75] Inventors: Wendell A. Ehrhart, Red Lion; Songvit Setthachayanon, Elizabethtown, both of Pa.

[73] Assignee: Armstrong World Industries, Inc., Lancaster, Pa.

[ * ] Notice: The term of this patent shall not extend beyond the expiration date of Pat. No. 5,663,003.

[21] Appl. No.: 885,503

[22] Filed: Jun. 30, 1997

Related U.S. Application Data

[63] Continuation of Ser. No. 644,207, May 10, 1996, Pat. No. 5,663,003, which is a continuation of Ser. No. 418,873, Apr. 6, 1995, Pat. No. 5,543,232, which is a continuation of Ser. No. 223,760, Apr. 6, 1994, abandoned.

[51] Int. Cl.$^6$ .............................. B32B 27/36; C08L 67/07
[52] U.S. Cl. .............................. 428/482; 525/10; 525/33; 525/35; 525/170
[58] Field of Search .............................. 428/482; 525/33, 525/170, 35, 10

[56] References Cited

U.S. PATENT DOCUMENTS

| | | | |
|---|---|---|---|
| 3,924,023 | 12/1975 | Boranian | 427/54 |
| 4,180,615 | 12/1979 | Beltoli | 428/339 |
| 4,304,879 | 12/1981 | Ehrhart | 525/35 |
| 4,421,782 | 12/1983 | Bolgiano | 427/53.1 |
| 4,781,987 | 11/1988 | Bolgiano | 428/424.6 |
| 4,820,745 | 4/1989 | Muller | 522/90 |
| 5,003,026 | 3/1991 | Ehrhart | 528/49 |
| 5,023,140 | 6/1991 | Glotfelter | 428/413 |

*Primary Examiner*—Patricia A. Short

[57] ABSTRACT

A resin composition comprises an acrylated polyester, the polyester being the reaction product of an equivalent excess of 1,6-hexanediol and an aromatic polycarboxylic acid or anhydride, preferably trimellitic anhydride. In the preferred embodiment, the reaction product includes a highly ethoxylated triacrylate. Upon UV initiated polymerization or copolymerization, improved clear coatings for "no-wax" resilient floors are obtained. These coatings have better resistance to household and other stains than commercial urethane/acrylate floor coverings.

10 Claims, No Drawings

(METH)ACRYLATED, HIGHLY ETHOXYLATED, AROMATIC POLYESTERS

CROSS-REFERENCE TO RELATED APPLICATION

This is a continuation of application Ser. No. 644,207, filed on May 10, 1996, now U.S. Pat. No. 5,663,003, which is a continuation of application Ser. No. 418,873, filed on Apr. 6, 1995, now U.S. Pat. No. 5,543,232, issued on Aug. 6, 1996, which is a continuation of application Ser. No. 223,760, filed on Apr. 6, 1994, now abandoned.

FIELD OF THE INVENTION

This invention relates to a surface covering layer comprising a resin composition including a (meth)acrylated polyester which polyester is the reaction product of an equivalent excess of a diol with an aromatic polycarboxylic acid or acid anhydride. The surface layer also includes blends of such (meth)acrylated polyesters with highly ethoxylated poly(meth)acrylates. Upon UV curing flexible coatings are produced that have good gloss retention and stain resistance. Though not so limited, such coatings are excellent flooring covering wear layers.

BACKGROUND OF THE INVENTION

Coatings which have been used as floor covering wear layers have either good gloss retention (resistance to foot traffic wear) or good stain resistance. The floor covering wear layers of the prior art have always had to compromise between these two desired properties.

For example, adding acrylic acid to typical wear layer compositions improves stain resistance at the expense of gloss retention. Adding isocyanate to form a urethane wear layer composition typically increases gloss retention, but degrades stain resistance.

Another factor that must be considered in a floor covering wear layer is that the floor covering must be flexible to permit installation. Also for use with tension floors which are perimeter bonded and shrink after installation, the wear layer must have sufficient elongation.

SUMMARY OF THE INVENTION

It is the object of the present invention to provide a surface layer resin composition that has both good stain resistance and gloss retention.

It is a further object to provide such a composition that also has sufficient flexibility and elongation.

These objects are met by blends of the (meth)acrylated aromatic polyesters which are described below and by the blends of the (meth)acrylated aromatic polyesters with highly ethoxylated poly(meth)acrylates.

As used herein the term "(meth)acrylate" means "methacrylate or acrylate." In like manner the term "poly(meth) acrylate" means "polymethacrylate or polyacrylate."

The term "ethoxylated" as used by those of ordinary skill in the art typically describes a compound having approximately one ethoxy moiety per hydroxy moiety of the original polyol. While such compounds are included in the present invention, it is preferred that the ethoxylated compounds of the present invention be "highly ethoxylated," e.g., have a plurality of ethoxy moieties per hydroxy moiety of the original polyol, and more preferably at least three ethoxy moieties per hydroxy moiety of the original polyol.

The definition of the term "propoxylated" is determined by analogy to the definition of the term "ethoxylated." As used herein the term "ethoxylated" is intended to include "propoxylated" where appropriate.

The term "polyester" is defined simply as the esterification reaction product of greater than one equivalent of a polyol per equivalent of polycarboxylic acid. These could be described as polyester polyols. The term "(meth)acrylated polyester" is defined as the esterification reaction product of acrylic acid or methacrylic acid and a polyester. The acrylic acid reacts mainly with the hydroxyl end groups of the polyester.

The term "aromatic polyester" is intended to include polyesters made from greater than one equivalent of a polyol per equivalent of total acid; the acid being at least 50 equivalent percent of aromatic polycarboxylic acid and no more than 50 equivalent percent of aliphatic polycarboxylic acids, including cycloaliphatic polycarboxylic acids. Examples of aromatic polycarboxylic acid or anhydrides include trimellitic acid and anhydride, phthalic acid and anhydride, and isophthalic acid.

DETAILED DESCRIPTION OF THE INVENTION

In searching for clear coatings with improved wear resistance properties, a coating was prepared by adding a photoinitiator package to Sartomer's SR-454 ethoxylated triacrylate monomer (see below).

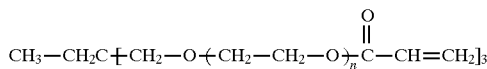

n = approx. 1 --- SR-454 (an ethoxylated triacrylate)
n = approx. 2 --- SR-499 (a highly ethoxylated triacrylate)
n = approx. 2 --- Photomer 4155 (a highly ethoxylated triacrylate)
n = approx. 3 --- SR-502 (a highly ethoxylated triacrylate)
n = approx. 5 --- SR-9035 (a highly ethoxylated triacrylate)
n = approx. 5 --- Photomer 4158 (a highly ethoxylated triacrylate)
n = approx. 7 --- SR-415 (a highly ethoxylated triacrylate)

This coating had excellent stain resistance and surprising foot traffic gloss retention for such a hard coating. The gloss retention, however, was little better than that of a softer, less stain resistant, commercial urethane wear layer. The coating was also too brittle for application to most resilient flooring substrates at any reasonable thickness. Also, its adhesion to polyvinylchloride was marginal.

Therefore, a superficially analogous structure in the acrylated polyester field was considered. It was expected to have better adhesion to vinyl. Hopefully, improved gloss retention/stain resistance balance would be obtained. Accordingly, trimellitic anhydride was reacted with a large equivalent excess of 1,6-hexanediol (Example 1), and then the hydroxyl end groups of the resulting polyester were esterified with acrylic acid (Example 5), in an attempt to approximate the following average structure.

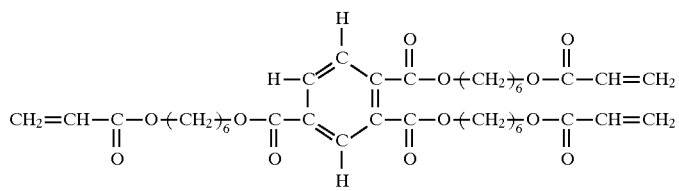

A photoinitiator was added to the acrylated polyester and drawdowns of the composition were made. Upon curing with UV, films were produced that were less brittle than the SR-454 derived films and had excellent adhesion to vinyl, excellent stain resistance and remarkable gloss retention.

Even though the composition was substantially free of urethane, the gloss retention was much better than that of the softer commercial urethane wear layer. Therefore, the present invention, which has preferably less than 25% urethane, has good gloss retention, better than commercial urethane wear layers.

Further improvements in flexibility and gloss retention were obtained with little or no loss of stain resistance, by blending with up to about 35% of highly ethoxylated, poly(meth)acrylates, preferably tri(meth)acrylates. See Example 10.

Still further improvements in flexibility, elongation and reduced cure shrinkage were obtained by substituting all or some of the trimellitic anhydride with phthalic anhydride and using less excess diol in forming the polyester. A particularly desirable formula for the top coat of flexible no-wax floors was derived from a polyester polyol prepared from an acid and/or anhydride blend which is approximately 35 equivalent percent phthalic and 65 equivalent percent trimellitic. The polyester (Example 2) was acrylated (Example 7) and blended with up to about 35 weight percent of SR-9035 (see Example 11b).

A preferred photoinitiator package for the blend is 0.25 to 3 parts per hundred parts resin (phr) benzophenone and 0.25 to 1.0 phr of 1-hydroxycyclohexylphenylketone. Use of more than about 35% of SR-9035 resulted in significant deterioration of household stain resistance.

As one substitutes less highly ethoxylated triacrylates such as Photomer 4155. SR-502, SR-499 and SR-454 for the SR-9035, larger percentages can be employed (100% in the case of SR-454) without very serious loss of stain resistance. However, reductions in flexibility, gloss retention, and/or adhesion to PVC were encountered.

The phthalic anhydride in the polyester of Example 2 can be replaced by other aromatic dicarboxylic acids (e.g., isophthalic and/or terephthalic) or by aliphatic dicarboxylic acids. There was less yellowing due to aging with the cycloaliphatic acids.

Preferably the viscosity of the resin composition before it is cured is less than 35,000 centipoise at 25° C., more preferably less than 30,000 centipoise, and most preferably less than 20,000 centipoise. The lower viscosities permit easier handling during production.

The present invention includes the substitution of 1,5-pentanediol for 1,6-hexanediol and propoxy moieties for ethoxy moieties.

EXAMPLE 1

A hydroxy terminated polyester (i.e. a polyester polyol) was prepared from a 600 gram charge of the following formulation in a 1 liter flask.

| Trimellitic anhydride | 1.0 eqs |
| 1,6-Hexanediol | 2.1 eqs |
| Phosphorous acid | 0.2 wt % |

The flask was equipped with a mantle, stirrer, thermometer, temperature controller, gas inlet tube (extended below the surface) and an upright partial condenser. The upright partial condenser was steam "heated," packed with glass helices, and had a still head with thermometer on top. The still head led to a downward water cooled total condenser, under which was a graduated cylinder. The water of esterification was collected and measured in the graduated cylinder.

The batch was heated gradually to 215° C. under a trickle of nitrogen gas. Twenty-six ml of aqueous distillate had been collected and the temperature of the vapors in the still head had fallen from 100° C. to 95° C. The nitrogen flow was raised to 0.6 std cubic feet/min and the batch was held at 215° C. until the Acid Number had fallen to below 5. The process took about 8 hours and 40 ml of aqueous distillate was collected.

The final product had an Acid No. of 4.9 and a Hydroxyl No. of 329. It thus had a hydroxy equivalent weight of 171 and an estimated number average molecular weight of about 505.

EXAMPLE 2

A hydroxy terminated polyester was prepared from the following formulation using equipment and procedure similar to that of Example 1.

| Trimellitic anhydride | 0.65 eqs |
| Phthalic anhydride | 0.35 eqs |
| 1,6-Hexanediol | 1.65 eqs |
| p-Toluenesulfonic acid | 0.02 wt % |

The maximum esterification temperature in this case was 220° C. On cooling to 95° C. under nitrogen, 0.1% phosphorous acid was stirred into the sample. After 20 minutes at 95° C., the product was discharged. The final product had an Acid No. of 3.3 and a Hydroxyl No. of 207. It thus had a hydroxy equivalent weight of 271 and an estimated number average molecular weight of about 880.

EXAMPLE 3

A hydroxy terminated polyester was prepared from the following formulation using equipment and procedure similar to that in Example 1. The maximum temperature was 220° C.

| | |
|---|---|
| Trimesic acid | 1.00 eqs |
| 1,6-Hexanediol | 2.065 eqs |
| Phosphorous acid | 0.035 wt % |

The final product had an Acid No. of 4.9 and a Hydroxyl No. of 330. It thus had a hydroxy equivalent weight of 170 and an estimated number average molecular weight of about 505.

EXAMPLE 4

A hydroxy terminated polyester was prepared from the following formulation using equipment and procedure similar to that of Example 1. The maximum temperature was 220° C.

| | |
|---|---|
| Trimellitic anhydride | 0.65 eqs |
| 1,4-Cyclohexanedicarboxylic acid | 0.35 eqs |
| 1,6-Hexanediol | 1.665 eqs |
| Phosphorous acid | 0.035 wt % |

The final product had an Acid No. of 5.6 and a Hydroxyl No. of 226. It thus had a hydroxy equivalent weight of 248 and an estimated number average molecular weight of about 758.

EXAMPLE 5

The polyester of Example I was acrylated as follows. The ingredients below were introduced to a 500 ml flask equipped with a mantle, stirrer, thermometer, gas inlet tube (extended below liquid surface), dropping funnel and Barrett Trap with a water cooled condenser on top.

| | |
|---|---|
| Heptane | 33 ml |
| Polyester from Example 1 | 217 g |
| Acrylic acid | 112 g |
| Monomethyl ether of hydroquinone | 0.030 g |
| 2,6-Di-tert-butyl-4-methylphenol | 0.030 g |
| Hydroquinone | 0.030 g |
| p-Toluenesulfonic acid monohydrate | 3.29 g |

The trap was filled to the overflow (112 ml) with heptane. With a dry air flow of 0.2 SCFH, the ingredients were heated to reflux at 98° C. to 105° C. while stirring vigorously and collecting water and displacing heptane in the trap. When approximately 16 ml of water had been collected, additional heptane (a total of 16 ml) was added through the dropping funnel as required to maintain reflux at 104° C. to 105° C. After about 3 hours of reflux, approximately 22 ml of aqueous distillate had collected. At this point all "water" (22 ml) and heptane (93 ml) were withdrawn from the trap and the dry air flow was increased to 2 SCFH. When distillation stopped, 50 ml of additional "heptane" had collected in the trap. The batch was cooled to 50° C. with a trickle of dry air present and charged with stirring were the following

| | |
|---|---|
| Benzophenone | 3.00 g |
| 1:1 Benzophenone:1-Hydroxycyclohexylphenylketone | 6.00 g |
| Methyldiethanolamine | 6.00 g |

When benzophenone was dissolved, the mixture was poured into brown jars. The Acid No. of the product was 22.8 and the Brookfield viscosity at 72° F. and 20 RPM was 2400 cps. Drawdowns of the product were prepared using a 3 mil Bird blade on glass and vinyl composition tile. The product was UV cured in two passes at 0.35 joules per pass under 200 watt per inch mercury vapor lamps.

In a 4 hour household stain test, the film deposited on the tile was rated 5. Iodine, shoe polish, hair dye, ball point pen ink and magic marker were deposited on the tile sample and removed after 4 hours. Each stain was rated from 0=no stain to 5=maximum stain. The rating for each stain was added to determine the overall stain rating, 25 being the maximum rating. A commercial UV curable no-wax coating was rated 14.

The film deposited on the tile retained 88% of its gloss after a 90 minute modified Taber abrasion test. The commercial UV curable urethane/acrylate no-wax coating showed only a 62% gloss retention in the same test.

EXAMPLE 6

A 510 gram batch of the following polyester polyol formula was prepared in a 1 liter flask using a procedure similar to that of Example 2.

| | |
|---|---|
| Trimellitic anhydride | 1.0 eqs |
| 1,6-Hexanediol | 2.0 eqs |
| Phosphorous acid | 0.2 w/w % |

The resulting polyester (approximately 470 grams with an Acid Number of 5.7) was acrylated in the same flask as follows. The gas inlet was replaced with a stopper, and the steam heated upright condenser was replaced with a 6 inch packed upright air condenser under a Barrett trap and water-cooled condenser. To the polyester in the flask was charged the following.

| | |
|---|---|
| Acrylic acid | 267 g |
| Monomethyl ether of hydroquinone | 0.0676 g |
| 2,6-Di-tert-butyl-4-methylphenol | 0.0676 g |
| Hydroquinone | 0.0676 g |
| p-Toluenesulfonic acid monohydrate | 7.37 g |
| Foamkill BR (a silicone antifoaming agent sold by Crucible Chemical Corp.) | 1 small drop |

The mix was heated to 103° C. with vigorous stirring. While holding the contents at 103° C., the flask was gradually evacuated to 180 mm via an adapter on top of the water-cooled condenser. This resulted in the collection of water of esterification in the trap. After holding at 180 mm and 103° C. for 4 hours, the pressure was lowered to 15 mm. The mantle was removed, and the vacuum was released. The trap contained approximately 61 grams of distillate with an Acid Number of 254 (41.1 grams of water and 19.9 grams of acrylic acid by calculation). This suggests a greater than 82%. esterification of the hydroxy end groups. The product had an Acid No. of 43.9, a Hydroxy No. of 34.6 (approximately 85% esterification by calculation), and a viscosity at 72° F. and 20 RPM of 2400 cps.

EXAMPLE 7

The following ingredients were charged to a 2 liter flask equipped as in Example 5.

| | |
|---|---|
| Polyester from Example 2 | 485 g |
| Acrylic acid | 175 g |
| Monomethyl ether of hydroquinone | 0.062 g |
| 2,6-Di-tert-butyl-4-methylphenol | 0.062 g |
| Hydroquinone | 0.062 g |

| | |
|---|---|
| p-Toluenesulfonic acid monohydrate | 7.25 g |
| Foamkill BR | 1 small drop |

The acylation was carried out in a manner similar to that of the second part of Example 6, except that the pressure was reduced to 150 mm to 155 mm and held for 1.5 hours, then gradually reduced to 20 mm over 2.33 hours. The actual water collected was 29.5 grams, suggesting 91% esterification. The product had an Acid No. of 44.4 and a viscosity at 71° F. and 20 RPM of 12,500 cps.

EXAMPLE 8

The following were charged to a 2 liter flask and the polyester acrylated using a procedure similar to that of Example 5. The reaction temperature was 101° C.+/−1° C.

| | |
|---|---|
| Polyester from Example 3 | 716 g |
| Heptane (initial in flask) | 105 ml |
| Acrylic acid | 400 g |
| Phosphorous acid | 0.616 g |
| Monomethyl ether of hydroquinone | 0.102 g |
| 2,6-Di-tert-butyl-4-methylphenol | 0.102 g |
| Hydroquinone | 0.102 g |
| p-Toluenesulfonic acid monohydrate | 5.39 g |

The following data were recorded.

| | |
|---|---|
| Total heptane used | 225 ml |
| Non aqueous distillate removed | 184 ml |
| Final weight of aqueous distillate | 90.0 g |
| Acid No. of non-aqueous distillate | 79.2 |
| Acid No. of aqueous distillate | 178.5 |
| Viscosity of product at 77° F. & 20 RPM | 1500 cps |
| Acid No. of product | 54.5 |
| Hydroxy No. of product | 60.3 |
| Gardner color | <1 |

EXAMPLE 9

The following were charged to a 2 liter flask and the polyester acrylated using a procedure similar to that of Example 5. The reaction temperature was 101° C.+/−1° C.

| | |
|---|---|
| Polyester from Example 4 | 781 g |
| Heptane (initial in flask) | 103 ml |
| Acrylic acid | 302 g |
| Phosphorous acid | 0.616 g |
| Monomethyl ether of hydroquinone | 0.102 g |
| 2,6-Di-tert-butyl-4-methylphenol | 0.102 g |
| Hydroquinone | 0.102 g |
| p-Toluenesulfonic acid monohydrate | 5.39 g |

The following data were recorded.

| | |
|---|---|
| Total heptane used | 223 ml |
| Non aqueous distillate removed | 130.5 g |
| Final weight of aqueous distillate | 65.3 g |
| Acid No. of non-aqueous distillate | 73.0 |
| Acid No. of aqueous distillate | 153.3 |
| Viscosity of product at 77° F. & 20 RPM | 2850 cps |
| Acid No. of product | 45.3 |
| Hydroxy No. of product | 48.1 |
| Gardner color | <1 |

EXAMPLE 10

The following formulations were prepared by hand stirring in brown jars.

| | a | b | c | d |
|---|---|---|---|---|
| Acrylated polyester, Ex 6 | 35.0 g | 30.0 g | 30.0 g | 37.5 g |
| Ethoxy triacrylate (SR-9035) | 15.0 g | 20.0 g | 20.0 g | — |
| Ethoxy triacrylate (SR-415) | — | — | — | 12.5 g |
| Benzophenone | 0.50 g | 0.50 g | — | 0.50 g |
| 1:1 Benzophenone:1-Hydroxy-cyclohexylphenylketone | 1.00 g | 1.00 g | 1.50 g | 1.00 g |
| Methyldiethanolamine | 0.50 g | 0.50 g | 0.50 g | 0.50 g |
| Ethoxylated siloxane surfactant (DC-193 sold by Dow Corning) | 0.05 g | 0.05 g | 0.05 g | 0.05 g |

Drawdowns of approximately 3 mil were then prepared on a vinyl composition tile. These were UV cured in air, using 2 passes at 0.35 joules/pass and 200 watt per inch mercury vapor lamps. The films deposited on the tile were subjected to the 4 hour household stain test where 0=no stain and 25=max stain. The results as follows.

| | a | b | c | d |
|---|---|---|---|---|
| Household stain | 6 | 13 | 14 | 8 |

The films on the tile were also subjected to the 90 minute modified Taber abrasion test. The 90 minute % gloss retention figures are given below.

| | a | b | c | d |
|---|---|---|---|---|
| Gloss retention | 86% | 94% | 95% | 92% |

EXAMPLE 11

The following ingredients were stirred together in brown jars until the benzophenone had dissolved.

| | a | b | c | d |
|---|---|---|---|---|
| Acrylated polyester, Example 7 | 25.0 g | 35.0 g | 40.0 g | 42.5 g |
| Ethoxy triacrylate Photomer 4158) | 17.0 g | — | — | — |
| Ethoxy triacrylate (Photomer 4155) | 8.0 g | — | — | — |
| Ethoxy triacrylate (SR-9035) | — | 15.0 g | 10.0 g | 7.5 g |
| Benzophenone | 1.00 g | 1.00 g | 1.00 g | 1.00 g |
| 1:1 Benzophenone:1-Hydroxycyclohexyl-phenylketone | 1.00 g | 1.00 g | 1.00 g | 1.00 g |
| Methyldiethanolamine | 0.625 g | 0.625 g | 0.625 g | 0.625 g |
| DC-193 | 0.050 g | 0.050 g | 0.050 g | 0.050 g |

Drawdowns of approximately 3 mils were prepared on vinyl composition tile. These were UV cured (samples a to d in air and samples b to d under nitrogen), in 2 passes at 0.35 joules/pass. The film samples a and b which were cured in air received 9's on the 4 hour household stain test. Sample 11a, deposited on the vinyl tile, was subjected to the 90 minute modified Taber abrasion test and its 90 minute gloss retention was 93.5%.

A comparison was made between sample 11b and sample 11a using a steel wool rub gloss retention test. Sample 11b was slightly better. Sample 11b compared favorably to all previous no-wax coatings in gloss retention, stain resistance and flexibility, especially when cured under nitrogen.

EXAMPLE 12

The following ingredients were stirred together in brown jars until all solids had dissolved.

|  | a | b |
|---|---|---|
| Acrylated polyester, Example 8 | 70.0 g | 75.0 g |
| Ethoxylated triacrylate (SR-9035) | 30.0 g | 25.0 g |
| Methyldiethanolamine | 0.23 g | 0.25 g |
| Benzophenone | 3.00 g | 3.00 g |
| 1-Hydroxycyclohexylphenylketone | 1.00 g | 1.00 g |
| DC-193 surfactant | 2 drops | 2 drops |

Drawdowns of approximately 1 mil were then prepared on a flexible PVC substrate. These were cured in 2 passes under nitrogen at 0.35 joules/pass, using 200 watt per inch Hg vapor lamps. The films on PVC were subjected to a 24 hour household stain test which was similar to the 4 hour household stain test except an additional stain, driveway sealer, was tested; the stains were removed after 24 hours; and the delta-E of each stain was measured and totaled. The films were also subjected to the 90 minute modified Taber abrasion test. The results were as follows.

|  | a | b |
|---|---|---|
| Stain (sum of delta-E) | 82 | 62 |
| Gloss (% gloss retention, 90 min) | 91% | 87% |

EXAMPLE 13

The following ingredients were stirred together in a brown jar until all solids had dissolved.

|  | a | b |
|---|---|---|
| Acrylated polyester, Example 9 | 70.0 g | 75.0 g |
| SR-9035 | 30.0 g | 25.0 g |
| Methyldiethanolamine | 0.23 g | 0.25 g |
| Benzophenone | 3.00 g | 3.00 g |
| 1-Hydroxycyclohexylphenylketone | 1.00 g | 1.00 g |
| DC-193 surfactant | 2 drops | 2 drops |

Drawdowns of approximately 1 mil were then prepared on flexible PVC substrate. These were cured in 2 passes under nitrogen at 0.35 joules/pass, using 200 watt/inch Hg vapor lamps. The films deposited on PVC were subjected to the 24 hour household stain test and the 90 minute modified Taber abrasion test. The results were as follows.

|  | a | b |
|---|---|---|
| Stain (sum of delta E) | 75 | 70 |
| Gloss (% gloss retention, 90 min) | 93% | 92% |

Therefore, the present invention has balance of stain resistance and gloss retention not previously obtained with organic wear layers, particularly wear layers for flexible sheet flooring. The prior art organic wear layers have not been able to obtain a stain resistance (sum of delta-E) of less than 120 while maintaining a 90 minute gloss retention of at least 85%. The present invention yields wear layers which have a stain resistance (sum of delta-E) of less than 100, even less than 85 with a 90 minute gloss retention of greater than 90.

We claim:

1. A surface layer comprising a (meth)acrylated polyester, the polyester being the reaction product of a diol and an aromatic tricarboxylic acid or anhydride, the diol being in excess of the aromatic tricarboxylic acid or anhydride on an equivalent basis and the reaction product of the diol and the acid or anhydride being (meth)acrylated, the surface layer having a stain resistance (sum of delta-E) of less than 100.

2. The surface covering of claim 1 wherein the diol is 1,6-hexanediol or 1,5-pentanediol.

3. The surface covering of claim 1 wherein the aromatic tricarboxylic acid or anhydride is trimellitic acid or anhydride.

4. The surface covering of claim 1 wherein the polyester comprises the reaction product of a diol and a first aromatic tricarboxylic acid or anhydride and a second aromatic polycarboxylic acid or anhydride which second aromatic polycarboxylic acid or anhydride is different from the first aromatic tricarboxylic acid or anhydride.

5. The surface covering of claim 4 wherein the first aromatic tricarboxylic acid or anhydride is trimellitic anhydride and the second aromatic polycarboxylic acid or anhydride is phthalic anhydride.

6. The surface covering of claim 1 wherein the polyester comprises the reaction product of a diol and an aromatic tricarboxylic acid or anhydride and a cycloaliphatic polycarboxylic acid or anhydride.

7. A surface layer comprising a blend of (1) a resin composition comprising a (meth)acrylated polyester, the polyester being the reaction product of a diol and an aromatic polycarboxylic acid or anhydride, the diol being in excess of the aromatic polycarboxylic acid or anhydride on an equivalent basis, the reaction product of the diol and the acid or anhydride being (meth)acrylated and (2) an ethoxylated triacrylate having the formula

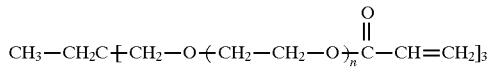

where n is 1 to 7.

8. The surface layer of claim 7 wherein the diol is 1,6-hexanediol or 1,5-pentanediol.

9. The surface layer of claim 6 wherein the surface layer is formed from a composition comprising less than 25% by weight of urethane.

10. The surface layer of claim 6 wherein the surface layer is formed from a composition which is substantially free of urethane moieties.

* * * * *